(12) United States Patent
Birschbach et al.

(10) Patent No.: US 11,966,640 B1
(45) Date of Patent: Apr. 23, 2024

(54) ADJUST PRINT SETTINGS USING MACHINE LEARNING

(71) Applicant: Hewlett-Packard Development Company, L.P., Spring, TX (US)

(72) Inventors: Cara Ellen Birschbach, Sant Cugat del Valles (ES); Volker Seidel, Sant Cugat del Valles (ES); Albert Franco Morera, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/934,547

(22) Filed: Sep. 22, 2022

(51) Int. Cl.
*G06F 3/12* (2006.01)

(52) U.S. Cl.
CPC .......... *G06F 3/1208* (2013.01); *G06F 3/1204* (2013.01); *G06F 3/1254* (2013.01); *G06F 3/1256* (2013.01); *G06F 3/12* (2013.01)

(58) Field of Classification Search
CPC .... G06F 3/1208; G06F 3/1204; G06F 3/1254; G06F 3/1256

USPC ......................................................... 358/1.13
See application file for complete search history.

(56) References Cited

U.S. PATENT DOCUMENTS

| 6,384,933 | B1 * | 5/2002 | McGinnis | G06F 3/1285 358/1.18 |
|---|---|---|---|---|
| 11,209,758 | B2 * | 12/2021 | Kopp | B41J 11/0022 |
| 2006/0164677 | A1 * | 7/2006 | Ahn | G06F 3/1211 358/1.15 |
| 2017/0036403 | A1 * | 2/2017 | Ruff | B33Y 40/00 |

FOREIGN PATENT DOCUMENTS

EP          3967495 A1      3/2022

* cited by examiner

*Primary Examiner* — Darryl V Dottin (57) ABSTRACT

A method for controlling a printer includes receiving a set of first variables for the printer, determining, using a machine-learning program, one or more second variables based on the set of first variables, and controlling a printer to perform a print job based on the set of first variables and the one or more second variables. The first and second variables may correspond to different types of printer settings. The machine-learning program may determine the second variables using a classifier model that may prevent partial curing or drying, print media deformation and/or other defects.

18 Claims, 5 Drawing Sheets

ADJUST PRINT SETTINGS USING MACHINE LEARNING

One or more embodiments described herein relate to automatically controlling printer settings for various applications.

A variety of printers have been developed to satisfy the needs of consumers. Some printers are used in the home or office to print documents, graphics, photos, and other types of information on selected print media. Other printers are used to print plots for larger scale applications. Examples of these plots include computer-aided design (CAD) and architectural drawings, art gallery prints, maps, commercial signs, and advertisements. These and other types of information may be printed on vinyl, canvas, fabric, adhesive paper, billboard paper, or other types of print media using, for example, dye-based inks.

Irrespective of scale, many printers in use today are controlled by a set of pre-defined settings which are often not optimal for the print job to be performed. The resulting printed product may therefore include defects which substantially diminish print quality.

DETAILED DESCRIPTION

Figure 1:
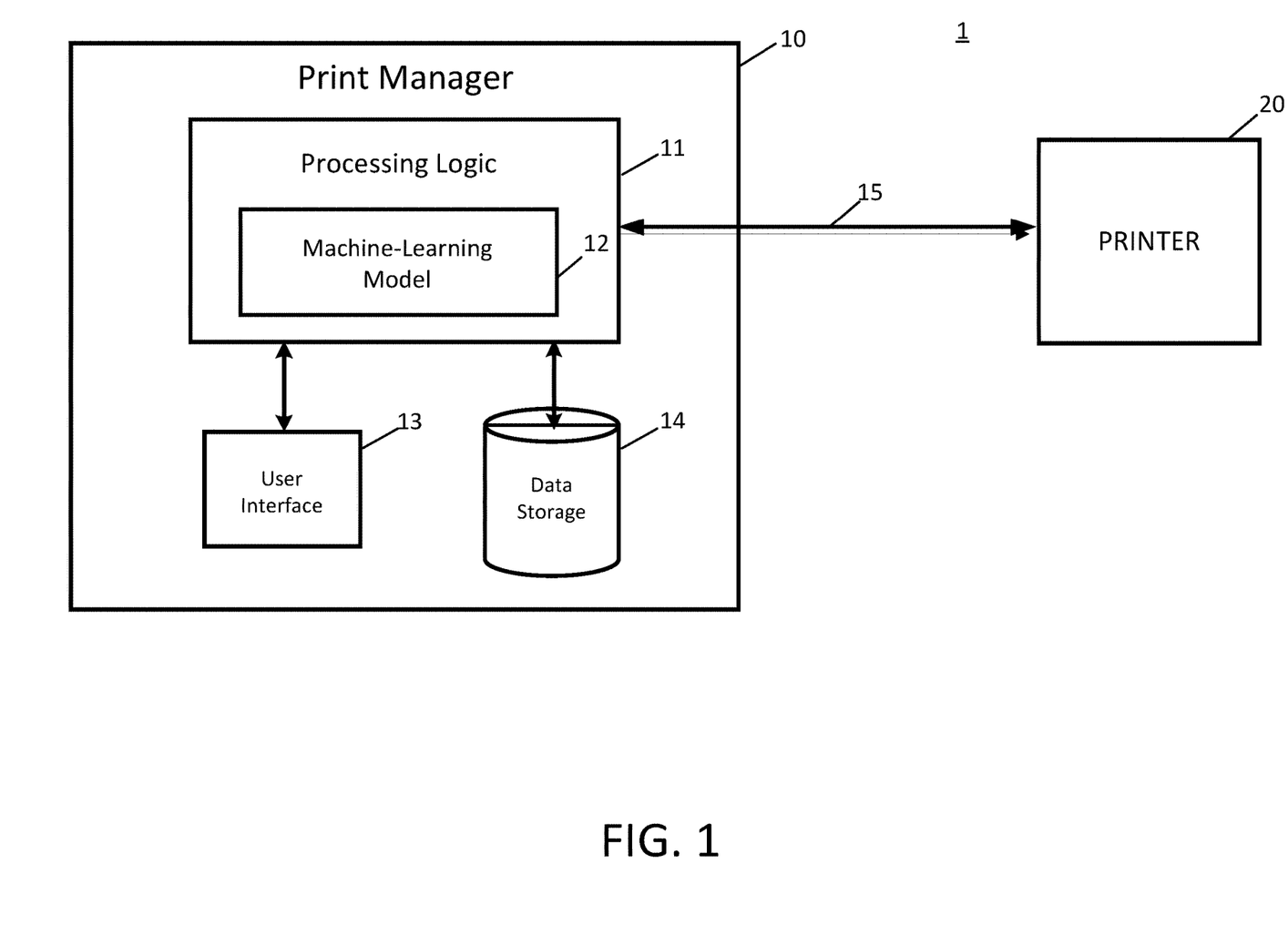
FIG. 1 shows an example of a system for automatically determining one or more settings of a printer.

FIG. 1 shows an example of a system 1 for automatically adjusting one or more settings of a printer for performing a print job. The print job may be for home, office, or commercial use for large or small scale applications. The printing may be performed using one or more printheads that apply ink to generate a rendering of information on a print medium. The print medium may be a paper or non-paper substrate. Some examples, discussed below, perform print jobs using latex ink, but different types of ink may be used in other examples.

Referring to FIG. 1, system 1 includes a print manager 10 which is integrated in or coupled to a printer 20. The print manager may be software-based, hardware-driven, or a combination of both implemented by one or more processing chips within the printer or, for example, terminal such as a host computer. The print manager may execute programs for controlling operation of the printer to perform a scheduled print job. When implemented outside the printer, the print manager 10 may be included in or correspond to a terminal such as a computer or workstation. In this latter case, the terminal may be coupled to printer 20 through a wired or wireless interface 15 and may execute control software to generate information for print jobs to be performed. The generated information may be sent to the printer through the interface for job execution. When included in the printer, the print manager 10 may both generate the print job information and control the printer accordingly. The interface 15 may be a direct line or a wireless network, such as but not limited to a local or wide-area network.

The print manager 10 includes processing logic (processor) 11, a memory 12, a user interface 13, and a data storage device 14. The processing logic may execute artificial intelligence software (instructions) stored in memory 12 for automatically determining one or more settings to be used in performing a scheduled print job. The artificial intelligence software may take various forms. According to one example, the artificial intelligence software may include a machine-learning model that operates as a binary classifier for determining custom printer setting(s) for each print job. The classifier may generate these setting(s) based on input information which, for example, may include one or more user-defined and/or printer variables. The user-defined variables may be input through the user interface 13 or may be stored in a memory within or coupled to the processing logic of the print manager in order to meet particular print requirements.

The classifier model may be trained based on a reference dataset, which is used to develop the model to automatically determine one or more custom printer settings. These settings may, for example, be considered optimal for the particular print job to be performed. The dataset may be stored in database 14 or another information storage area accessible by the processing logic 11. In one example, the printer settings may be ones that improve the quality of a print job.

As will be discussed in greater detail below, each training dataset may include a first number of settings that correspond to a second set of settings for an associated print job. The first number of settings may include one or more controllable variables, and the second number of settings may include one or more user-defined and/or printer variables. The ability of the classifier to generate optimal (or otherwise high quality) printer settings may coincide with the information in the training dataset used to train the model. A larger training dataset may allow the classifier to determine more accurate controllable variables to be used during a use mode of the printer.

In one example, the printer 20 to be controlled by system 1 may perform print jobs using latex ink. The printer may include at least one inkjet printhead that applies latex ink on a vinyl, paper, fabric or another type of substrate or print medium. As the name implies, latex ink may be composed of various combinations of ink mixed with a polymer in an aqueous solvent. The polymer serves to improve durability of the printed product, and also gives the ink waterproof properties which makes it especially suitable for generating products for outdoor use.

The improved durability of latex ink is achieved by the cross-linking of latex polymer particles after the aqueous solvent (e.g., water) is eliminated through evaporation and absorption. The polymer particles may be prepared, for example, using emulsion polymerization techniques, such as batch, semi-batch or mini-emulsion processes. In some processes, polymer particles may be produced using hydrophobic monomers and acidic monomers, along with at least one cross-linkable monomer, but this is just one example.

Regardless of its specific composition, latex ink is a heat-fusing ink that is to be heated in order to form a film on a print medium. The heating may involve any of curing or heating or drying the latex ink. The heating process is performed using a predetermined set of variables which correspond to the controllable variables previously discussed. In one example, the controllable variables include heating temperature, heating pressure, and the linear velocity of the print medium traveling through the printer. Existing processes perform heating of latex ink using a predetermined set of parameters that are fixed, irrespective of the type of print medium and latex ink used. The use of fixed heating parameters fails to take into consideration the particular attributes of the ink and print medium and the user-defined and printer variables that affect the conditions under which heating of the ink is to be performed. As a result, existing processes produce printed products of low quality due to incomplete curing or heating (e.g., drying) of the latex ink, print media deformations, and/or other defects.

In accordance with one or more examples, the processing logic 11 implements a machine-learning model to automatically determine the set of controllable variables that produces an improved printed product (e.g., plot) formed using latex ink. The machine-learning model may determine the controllable variables based on one or more user-defined and/or printer variables previously discussed. As discussed in greater detail below, the user-defined and printer variables may, for example, be indicative of certain attributes of the plot or settings of the printer, respectively. Once the variables are input into the model, the model may include a classifier that applies statistical, probabilistic or other techniques to automatically determine values of the variables considered optimal for that job, or which are otherwise sufficient to satisfy certain desired attributes of the finished product. Through the use of classifier, printer 20 may therefore be controlled to generate a custom print job with improved quality compared with other techniques that have been proposed using latex inks.

Figure 2:
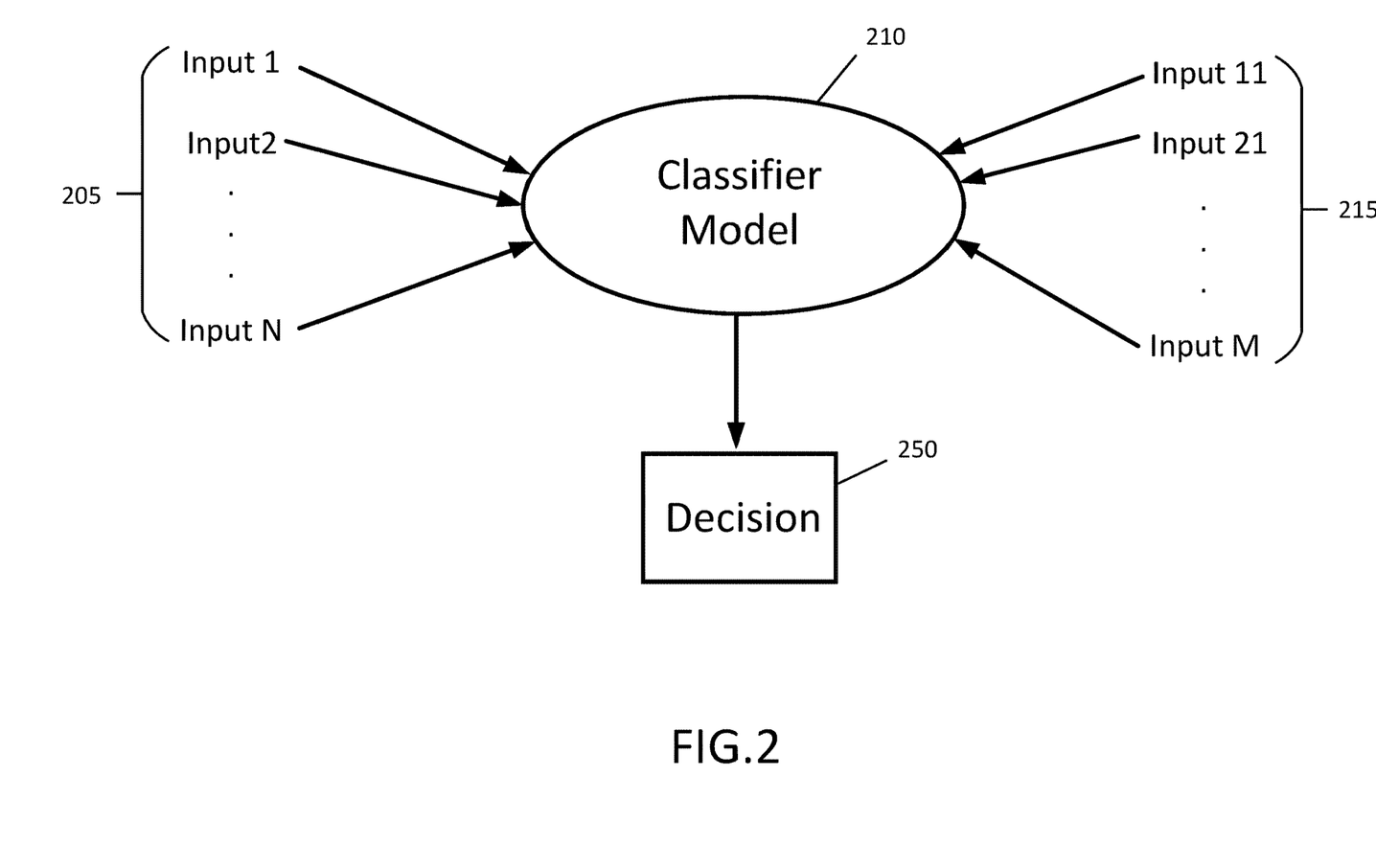
FIG. 2 shows an example of a machine-learning architecture that may be used for determining one or more settings of a printer.

FIG. 2 shows one example of machine-learning logic which may be used by processing logic 11 to automatically determine the controllable variables for a print job. Referring to FIG. 2, the machine-learning logic includes a classifier model 210 which receives a set of N inputs (Input$_1$, Input$_2$, . . . , Input$_N$) 205 and a set of M inputs (Input$_{11}$, Input$_{21}$, . . . , Input$_M$) 215, where N≥1 and M≥1. The N inputs may include user-defined and/or printer variables and, in one example, may include all or a portion of the following:

Plot Density
Print Mode
Leading Edge Starting Position
Time since Last Plot
Ambient conditions The plot density may correspond to the density of latex ink desired to be used for the plot. The print mode may correspond to the number of carriage passes that are to be performed in order to create the image. The leading edge starting position may correspond to the location of the leading edge of the print medium being advanced through the printer. Other options include at pinches, past curing module, or attached to a take-up reel. The time since the last plot may correspond to the amount of time since the last plot finished. This may affect the starting temperature of printer 20 when a new plot is sent to the printer. Ambient conditions may include temperature and/or humidity, e.g., the room temperature and humidity where printer 20 is located.

The M inputs are controllable variables which are automatically determined by the classifier model (relative to the user-defined and/or printer variables) in order to improve the print quality of the plot. As described below, a set of default values of the controllable variables may be initially input into the model for analysis. The controllable variables may include the temperature for heating the latex ink once applied to the print medium, heating pressure, and linear velocity of the print medium through the printer. The controllable variables may be based on the user-defined and/or printer variables. For example, heating temperature may be based on plot density and linear velocity. While the heating of latex ink is described as one example of a printing fluid subject to the controllable parameters, other examples may apply to other types of printing fluid different from latex ink. For example, while one type of printing fluid includes latex ink, one or more other examples may apply to printing fluids such as non-marking fluids or colorants. Thus, as used herein, the term "printing fluid" may cover all of the aforementioned types of printing fluids as well as printing fluids that are not mentioned, and the examples described herein may apply to any of these printing fluids.

Table 1 set forth below shows an example of the general relationships that may exist between each of the user-defined/printer variables and the controllable variables. This table also shows how each of the controllable variables may relate to the other controllable variables. The table shows first the individual effect (generally) of each variable on the heating (e.g., curing or drying) capacity. It then shows the independent adjustments that would be performed from the controllable variables to compensate the effect on heating capacity. Various factors may come into play when determining heating capacity. In some cases, it may be difficult to predict with 100% certainty the effect each of the variables may have on one another. Because of this, we may rely in many cases on examples from an extensive dataset which defines the solution space.

Regarding the Print Mode variable, the behavior may be based on the assumption that increasing the print mode (e.g., number of carriage passes) decreases the linear velocity, and that in changing this variable the ink density may not be changed. For these reasons, in some cases the behavior under linear velocity may be blank, since this variable would not be able to be controlled in this case.

Regarding the Leading edge starting position, though the general effect on heating (e.g., curing or drying) capacity may be known in some examples, the adjustments to be performed from the controlled variables may not be as clear. This is because various factors may come into play to ensure that a good plot is achieved. For this case, in one example adjustments of the controlled variables may closely follow the dataset examples for good plots.

TABLE 1

|  | Effect on Curing Capacity |  | Temperature | Curing Pressure | Linear Velocity |
|---|---|---|---|---|---|
| Plot Density | ↑ | − | ↑ | ↑ | ↓ |
|  | ↓ | + | ↓ | ↓ | ↑ |
| Print Mode (number of carriage passes, same ink density) | ↑ | + | ↓ | ↓ | — |
|  | ↓ | − | ↑ | ↑ | — |

TABLE 1-continued

| | | Effect on Curing Capacity | Temperature | Curing Pressure | Linear Velocity |
|---|---|---|---|---|---|
| LE Starting Position | Pinches | − | — | — | — |
| | Past curing | + | — | — | — |
| | Take-up Reel | + | — | — | — |
| Time since Last Plot | ↑ | − | ↑ | ↑ | ↓ |
| | ↓ | + | ↓ | ↓ | ↑ |
| Ambient Temperature | ↑ | + | ↓ | ↓ | ↑ |
| | ↓ | − | ↑ | ↑ | ↓ |
| Ambient Humidity | ↑ | − | ↑ | ↑ | ↓ |
| | ↓ | + | ↓ | ↓ | ↑ |
| Temperature | ↑ | + | — | ↓ | ↑ |
| | ↓ | − | — | ↑ | ↓ |
| Curing Pressure | ↑ | + | ↓ | — | ↑ |
| | ↓ | − | ↑ | — | ↓ |
| Linear Velocity | ↑ | − | ↑ | ↑ | — |
| | ↓ | + | ↓ | ↓ | — |

In existing printing systems, the controllable variables are predetermined and fixed. In accordance with one or more examples, the classifier model selectively and automatically determines the values (e.g., optimal values) of the controllable variables for each particular print job. By customizing the values of the controllable variables, complete curing or drying may be ensured, media deformations and other defects may be prevented, print media waste may be avoided, and unnecessary consumption of power may be reduced.

In one example, the training dataset for the model may be configured to include plots that have been classified as high quality and plots that have been classified as low quality, for example, relative to a margin requirement of an SVM implementation, which, for example, is discussed in greater detail below. The high quality plots may correspond to completely cured or dried plots with no or reduced print media deformations and other defects. The low quality plots correspond to partially uncured or undried plots and/or ones likely to produce print media deformations or other defects.

Each dataset includes a combination of N user-defined and/or printer variables and M controllable variables that map to a corresponding data point in a two- or three-dimensional space. The two- or three-dimensional space may include an area or volume that defines a solution space. The solution space encompasses data points linked to controllable variables that produce high quality plots based on their associated user-defined and/or printer variables. Data points that lie outside of the solution space correspond to combinations of variables that produce low quality plots. In operation, the classifier model maps input variables for a specific print job to a data point in the two- or three-dimensional space. The location of the data point (inside or outside the solution space) predicts a decision 250 of whether or not the variables are likely to produce a plot of a high quality. The classifier model may be implemented in the software or firmware of the system that is to be executed by the processing logic 11.

Figure 3:
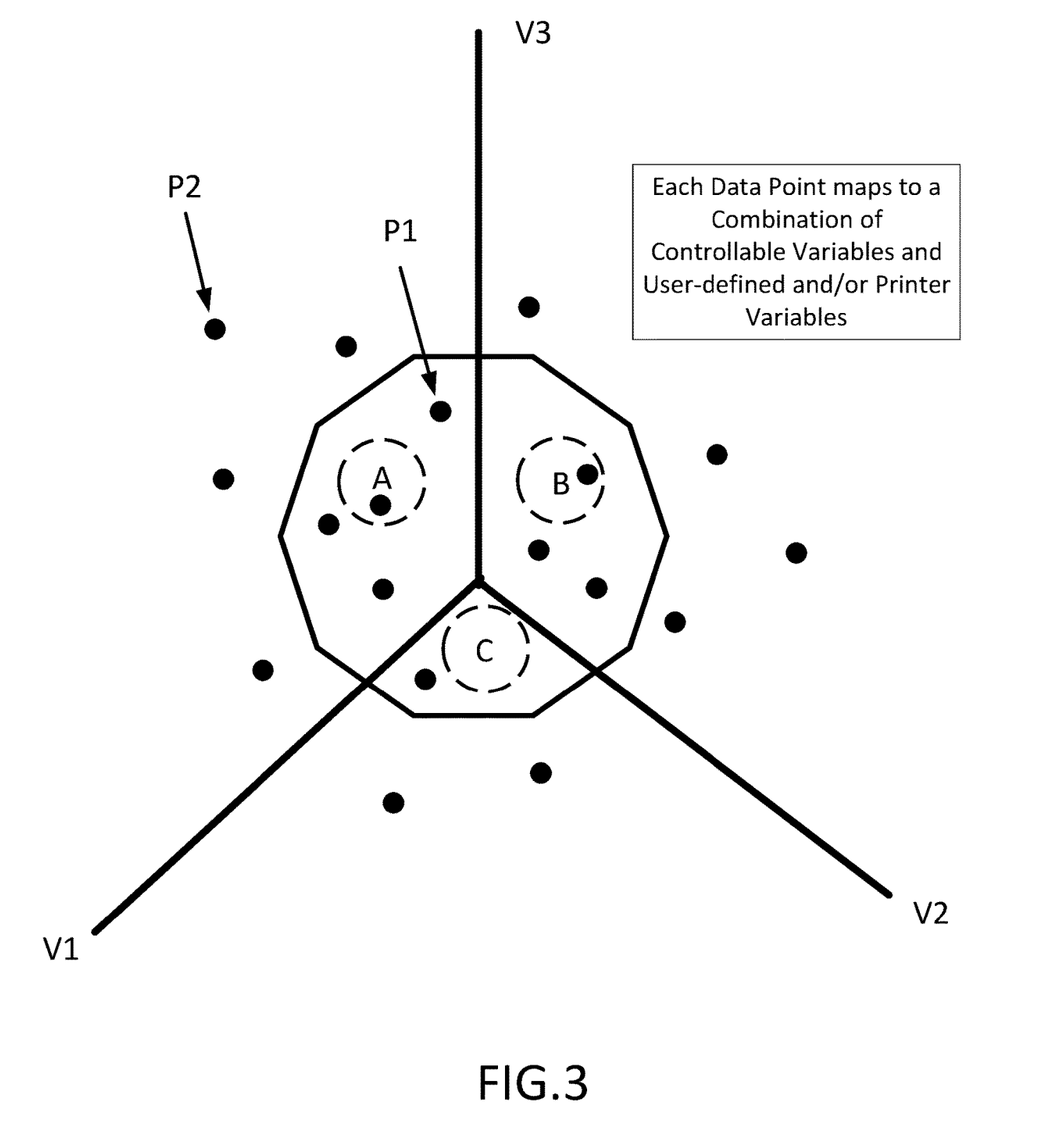
FIG. 3 shows an example of solution space that may be used to determine one or more settings of a printer.

FIG. 3 illustrates a conceptual example of a three-dimensional (3D) space that may be generated by the training dataset of the classifier model. The 3D space has three axes which respectively correspond to three controllable variables, which, for example, may be curing temperature ($V_1$), curing pressure ($V_2$), and linear velocity of the print medium ($V_3$). In one example, the three-dimensional space may be partitioned into at least two regions. The first region 310 may encompass data points P1 for high quality plots, e.g., ones having variable combinations that are predicted to be satisfactory. The second region 320 lies outside of the first region and includes data points P2 for low quality plots.

Figure 4:
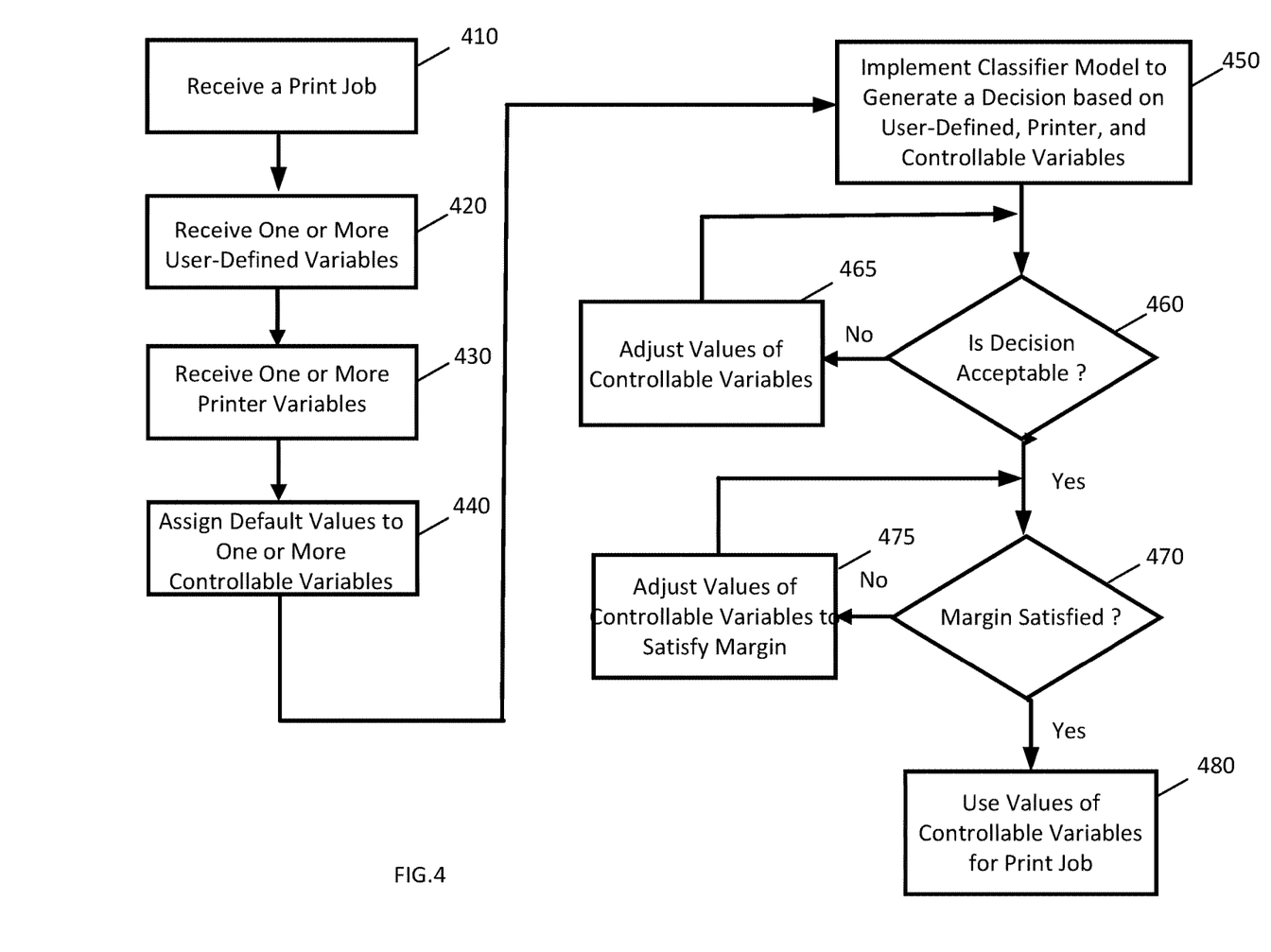
FIG. 4 shows an example of a method for automatically determining one or more settings of a printer.

FIG. 4 shows an example of a method which may be implemented by the system 1 using a classifier model. Once the classifier model has been trained, system 1 may be set to use mode for automatically determining the controllable variable(s) for a scheduled print job. This may be accomplished in various ways.

Referring to FIG. 4, in accordance with one example, the method includes, at 410, the printer 20 receiving a print job. The print job may be initiated, for example, by the print manager of the printer or a host terminal connected to the printer. The print job may be performed by printing latex ink on a print medium selected by a user. Because latex ink is used, the method may include controlling the curing or drying of the latex ink in order to produce a printed product of improved quality, as described herein.

At 420, the classifier model receives one or more user-defined variables for the print job. The user-defined variable(s) may correspond to certain printer settings and/or features of a printed plot of the print job. In one example implementation, the user-defined variables may include features that relate to the plot to be printed and therefore may be considered as user-defined plot variables. According to one example, the user-defined plot variables may include plot density and print mode, which, for example, may be indicated based on information input into the system through user interface 13. A different number and type of user-defined variables may be received by the model in another example.

At 430, one or more additional variables may be received by the classifier model that relate to the printer itself. These variables may affect the status or quality of the print job and thus may be considered as printer variables. As an example, the printer variables may be indicative of the leading edge starting position of a print medium used for the print job, the time since the last plot was printed by the printer, and one or more ambient conditions (e.g., temperature, humidity, etc.) in an area proximate the printer. The printer variables may be received from sensors of the printer, or in the case of the last plot time may be received from a print manager of the printer or a host terminal running print manager software.

At 440, the processing logic 11 of the system assigns default values to one or more controllable variables. The default values may be predetermined, for example, based on values taken from the training dataset (e.g., an average) used to train the classifier model or may be pre-selected fixed values. In one example, the default values may be determined based on the printer mode (pmode) indicated in the user-defined variables received in operation 420. In one example, only one of operations 420 or 430 may be performed.

At 450, the classifier model is implemented to generate a decision based on the user-defined variable(s), the printer variable(s), and the default value(s) of the controllable variable(s). The decision may be binary in nature, indicating whether or not the resulting plot will be partially uncured or undried and/or likely have any media deformations or defects. As previously discussed, the logic of the classifier model may be implemented to generate a data point relative to the solution space. Based on the location of the data point relative to the solution space, the classifier model generates a decision predicting, for example, whether the plot is of high quality (e.g., will be completely cured or dried with no or reduced deformations or defects) or whether the plot will be low quality (e.g., partially uncured or undried, and/or contain deformations or defects) based on use of the default values of the controllable variables.

At 460, the processing logic 11 controls the process flow of the method based on the decision generated by the classifier model. If the classifier model generates a decision of high quality (e.g., the plot will likely be completely cured and/or no deformations or other defects) using the default values, then, at 480, the processing logic 11 of the system may accept the default values of the controllable variables and control the printer to perform the print job based on those variables and their associated user-defined and/or printer variables. However, in many cases the default values will not produce a high quality plot. In this case, when the classifier model determines the decision to be low quality (because the plot will likely be partially uncured or undried and/or have deformations or defects), then, at 465, the processing logic will automatically adjust one or more values of the controllable variables based on the output of the classifier model.

At 465, once a decision of low quality has been determined by the classifier model, the processing logic 11 may adjust one or more of the controllable variables until the resulting data point moves into the solution space. The controllable variables may be adjusted in various ways. For example, one of the controllable variables may be increased or decreased (e.g., incrementally) relative to its default value and the other controllable variable(s) may be kept at their default values. A new data point may then be generated in the 3D space by the classifier model and a corresponding decision may be generated based on whether the newly generated data point lies in the solution space. If the data point does not lie within the solution space, additional (e.g., iterative) adjustments may be made to one or more of the variables in operation 465. In another example, multiple controllable variables may be adjusted simultaneously until a new data point is moved into the solution space.

The controllable variables may be changed to move the data point into the solution space in various ways. In one example, to move the datapoint into the solution space, the dataset may be referenced to find a point which has the most similar values for each of the inputs (user-defined and/or printer variables) and is classified as 'cured' or 'dried'. The new point to be adjusted should take on values of this point, effectively moving it into the solution space. If there are multiple datapoints which fit these criteria, the point located closest in space to the boundary may be chosen. Distance criteria may be based, for example, on Euclidean distance according to the following equation:

$$d(p, q) = \sqrt{\sum_{i=1}^{n}(q_i - p_i)^2}$$

$p, q$ = two point in Euclidean n-space $q_i, p_i$ = Euclidean vectors, starting from the origin of the space (initial point)

$n$ = n-space

Once a data point is generated that lies in the solution space, the values of the controllable variables that produced the data point may be stored. The print job may then be performed, at operation 480, to produce a finished product with improved quality.

Prior to operation 480, a number of additional operations may optionally be performed. For example, at 470, an operation may be performed which involves determining whether the data point generated by the model relative to a margin requirement corresponding to the solution space. This operation may be performed, for example, when the classifier model is implemented by a support vector machine, described in greater detail below. If the margin requirements are not satisfied, then, at 475, one or more of the controllable variable(s) may be adjusted further until the resulting data point satisfies the margin requirements relative to the solution space. In one example implementation, the margin requirements may require a data point to be generated which is spaced from the solution space boundary by a predefined distance.

The additional adjustments of the controllable variable values may be performed in various ways. In one example, an incrementation approach may be used. For example, incrementation may be performed sequentially according to a desired benefit selected by a user. The following may be implemented in performing the adjustments in view of a desired benefit.

Reduced power consumption/sensitive media→maintain LOWEST acceptable temperature Print from pinches/reduce media waste→maintain LOWEST acceptable curing (or drying) pressure Increase productivity→maintain HIGHEST acceptable linear velocity Once a desired benefit is selected, an approach may be used where temperature starts LOW and is increased, pressure starts low and is increased, and/or linear velocity starts high and is decreased. According to one example, if reduced power consumption/sensitive media is selected as desired benefit, temperature may be set at lowest acceptable value. Curing (or drying) pressure and linear velocity may then be incremented (e.g., sequentially or according to a predetermined step) to achieve correct margin. If no correct margin can be found by incrementing curing (or drying) pressure and linear velocity, temperature may be incremented and the process may be repeated.

The purpose of using a margin requirement is to ensure that a print job of high quality is produced. If the margin requirements are satisfied at operation 470, then, the values of the controllable variables determined at operation 480 are sent by the processing logic 11 to control performance of the print job based on the adjusted controllable variable values and their associated user-defined and/or printer variables.

In adjusting the controllable variables, some print quality attributes may be emphasized over others. For example, low curing (or drying) temperature may favor reduced media deformations and lower power consumption. Low curing (or drying) pressure may favor print from pinches capabilities, which may correspond to improved media usage (e.g., waste reduction). High linear velocity may favor productivity and, for example, may be increased in cases of relatively narrow print media with low ink density plots.

Each of the print quality attributes may therefore correspond to a respective one of the controllable variables. Accordingly, in one example the classifier model may receive a user input indicating which one of the desired print quality attributes is to be emphasized. The processing logic 11 may then adjust a corresponding one of the controllable variables from its default (or previously adjusted) value to produce a data point within a sub-region of the solution space that emphasizes a corresponding one of the print quality attributes.

Referring to FIG. 3, for example, sub-region A includes data points in the solution space that are biased in favor of reduced media deformations or lower power consumption. Data points in sub-region A may therefore have data points that have a relatively lower curing (or drying) temperature. The processing logic may adjust one or more of the values of the controllable variables until a data point is produced in sub-region A. Similarly, sub-region B includes data points P in the solution space that are biased in favor of print media waste reduction. The data points in sub-region B may therefore have a relatively lower curing (or drying) pressure. In this case, the processing logic may adjust one or more of the values of the controllable variables until a data point is produced in sub-region B. Sub-region C includes data points P in the solution space that are biased in favor of productivity. The data points in sub-region C may therefore have relatively higher linear velocity. In this case, the processing logic may adjust one or more of the values of the controllable variables until a data point is produced in sub-region C.

The classifier model may be configured in a variety of ways. For example, the classifier model may be configured to implement logic based on a decision tree, random forest classification, logistic regression, a support vector machine, a neural network architecture, or another type of binary classification model. In this case, values or decisions generated by the model may be compared with a predetermined threshold (e.g. a boundary of the solution space) to indicate a binary result of whether the data point is or is not in the solution space.

Figure 5:
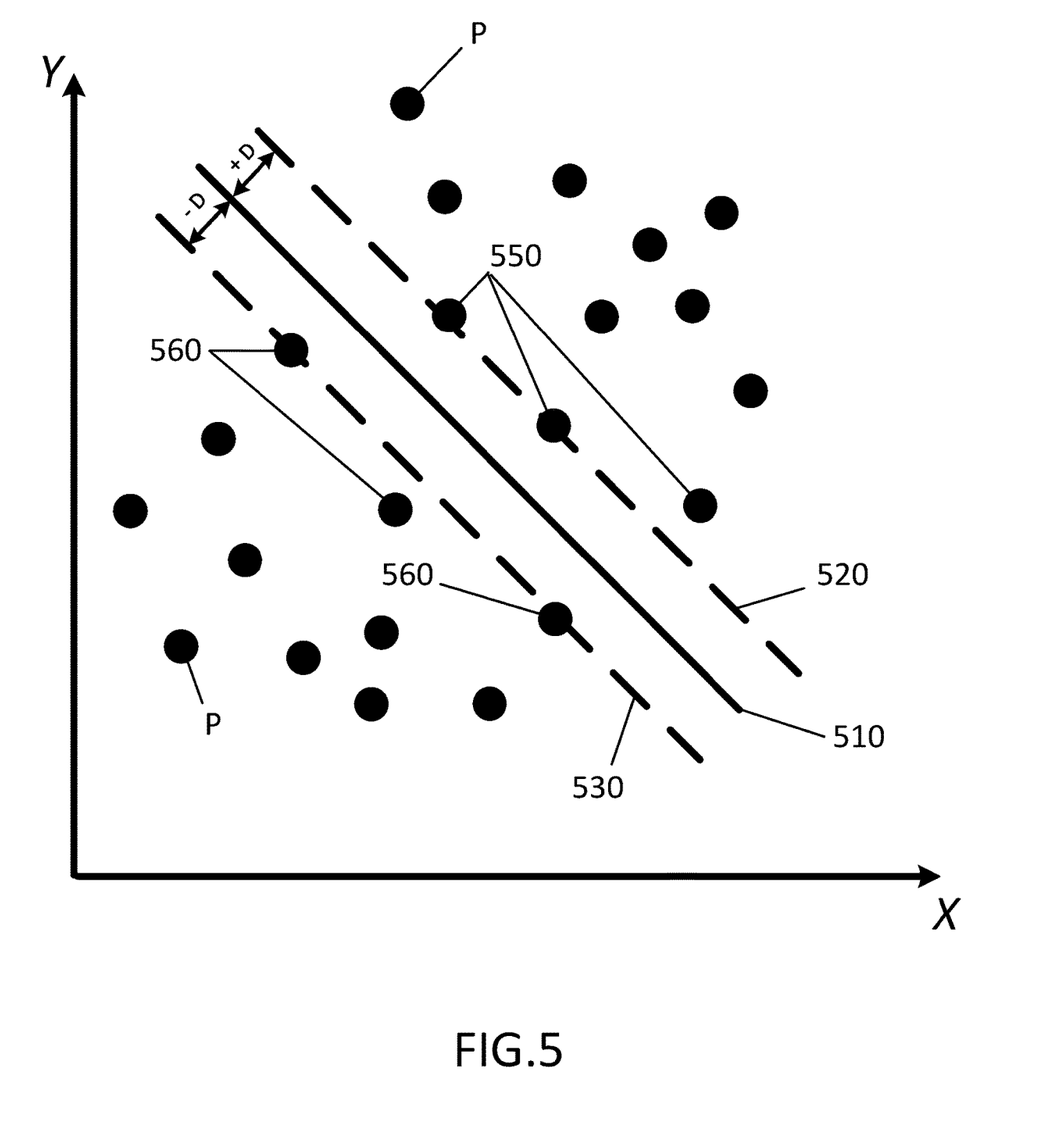
FIG. 5 shows an example of a feature space of a support vector machine that may be used to implement a machine-learning model.

FIG. 5 shows an example of a feature space of a support vector machine (SVM) that may be used to implement the logic of the classifier model. In this example, the SVM model maps data points P of the training dataset into a multi-dimensional feature space. Some of the data points will map to a class of high quality plots and the remaining data points will map to a class of low quality plots. The spatial distance between these plots includes a decision boundary called a hyperplane which partitions the data points into the two classes.

Referring to FIG. 5, a two-dimensional application (e.g., two controllable variables) includes a hyperplane 510 which is expressed as a line that separates the data points into the two classes. The line may be defined relative to a margin requirement, represented by two parallel lines that are equidistant (+D, −D) from the hyperplane. In the example of FIG. 5, the two parallel lines defining the margin include upper line 520 and lower line 530. Data points above the upper line 520 define the solution space of the model, e.g., correspond to high quality data points. Data points below a lower line 530 correspond to low quality data points.

The locations and orientations of the margin lines are determined by support vectors. The support vectors 550 and 560 are determined as data points that lie on (or are closest to) the upper and lower lines, respectively. The processing logic of the system may determine the locations of the data points that correspond to the support vectors. For example, data points 550 determine the location and orientation of the upper line 520 relative to the hyperplane and data points 560 determine the location and orientation of the lower line 530. The remaining data points P (ones that do not correspond to the support vectors) lie farther away from the hyperplane and are thus included in the associated class.

In a practical application, the SVM defines each of the data points as a vector relative to a reference coordinate system that corresponds to the controllable variables, which in this example are X=curing (or drying) temperature and Y=curing (or drying) pressure. Because the controllable variables are based on a particular set of user-defined and/or printer variables, it is possible that a different hyperplane may be provided for each set of user-defined and/or printer variables implemented in the SVM model.

It is to be noted that a greater margin (±D) relative to the hyperplane may translate into a greater degree of separation between the data points in the two classes and thus the more accurate the decision generated by the model. For this reason, the margin may be maximized to provide a clearer distinction between the data points in the two classes. During use mode, the SVM model may map adjusted values of controllable variables (for a given set of user-defined and/or printer variables) within one of the two classes relative to the hyperplane.

In one example, a kernel (a mapping function) may be applied to reposition the data points relative to one another during classification. For example, a kernel may be applied using a function that maps the data points in the training dataset (and new inputs applied during use mode) to a higher-dimensional space, where the separation distance between data points in the two classes is more clearly defined. The mapping function of the kernel may, for example, map data points in a two-dimensional space to corresponding data points in a three-dimensional space, where the separation distance between the points in the two classes is greater. In this case, the decision boundary may be expressed as a plane instead of a line. Examples of the kernel that may be applied include, but are not limited to, a linear kernel, a polynomial kernel, a radial basis function kernel, and a sigmoid kernel.

The SVM model may be developed and trained as follows. First, the training dataset $(x_1y_1, \ldots, x_ny_n)$ are received, where input x corresponds to a feature vector (e.g., defining a data point that corresponds to a combination of controllable variables for a given set of user-defined and/or printer variables) and y indicates which one of the two classes the corresponding input belongs to. For each input x, the value of y may be predetermined, for example, by a user as corresponding to one of the classes.

Once the dataset have been received, the goal is to mathematically find a decision boundary (hyperplane) with a maximum margin that separates the data points in the training dataset into two classes: low quality plot and high quality plot. The hyperplane may be determined, for example, using optimization techniques, where w represents a margin vector which is perpendicular to the hyperplane and is to be maximized. In one example, the hyperplane may be defined by Equation 1:

$$w^T x + b = 0 \quad (1)$$

where x is the input, b is a scalar value, and w is the margin situated normal to the hyperplane. In the term $w^T$, T refers to the polynomial degree which may define a shape of the hyperplane. For example, if a flat plan is sufficient to separate the classes, T=1 corresponding to linear separation may be used. If a more precise separation is desired, polynomials of higher degrees may be used. This value is usually defined within the kernel.

In Equation 1, the orientation of the hyperplane is determined by the quantity $w^T x$ and the position of the hyperplane relative to the origin of the feature space is determined by the quantity b. Data points above the hyperplane have a value of 1, e.g., for a given input $x_i$, $w^T x + b > 0$ may have an output $y_i = 1$ corresponding to a high quality plot. Data points below the hyperplane have a value of −1, e.g., for a given input $x_i$, $w^T x + b < 0$ may have an output $y_i = -1$. These inequalities may be used as a basis for determining the limits of the margin. As described below, the goal is to maximize the margin. This will provide the greatest distance between the data points in the two classes, thereby improving accuracy of the model. Maximizing the margin may be performed based on a vector dot product of the data points in the training dataset. The decision function which produces these classifications may be based on Equation 2:

$$f(x) = \text{sign}(w^T x + b) \quad (2)$$

since f(x)=+1 for all inputs (data points) above the hyperplane and f(x)=−1 for all inputs (data points) below the hyperplane.

Using Equation 2, whether or not an instance has been classified properly may be determined by checking that $y(w^T x + b) \geq 1$ (which will be the case as long as either both y, wT x+b>0 or else y, $w^T x + b < 0$). Here, the term y may be equivalent to f(x) and may correspond to the classification. Through these relations, it is evident that some space exists between the decision boundary (e.g., hyperplane) and the nearest data points of either class.

In implementing the support vector machine, note that the data may be rescaled such that any point on or above the boundary $w^T x + b = 1$ is of one class (with label +1), and any point on or below the boundary $w^T x + b = -1$ is of the other class (with label −1). The distance between these newly added boundaries may correspond to the margin. In the example of a linear support vector machine, the boundaries are lines that are parallel to one another and the hyperplane, and thus share their parameters w, b.

In determining the margin, an arbitrary point x1 may be chosen to lie on line $w^T x + b = -1$. Then, the closest point on line $w^T x + b = 1$ to x1 is the point x2=x1+λw (since the closest point will always lie on the perpendicular; recall that the vector w is perpendicular to both lines). Using this formulation, λw will be the line segment connecting $x_1$ and $x_2$, and thus λ ‖w‖ the distance between $x_1$ and $x_2$, is the shortest distance between the two lines/boundaries. Solving for λ, Equations (3) to (8) may be expressed as follows:

$$\Rightarrow w^T x_2 + b = +1, \text{ where } x_2 = x_1 + \lambda w \quad (3)$$

$$\Rightarrow w^T (x_1 + \lambda w) + b = +1 \quad (4)$$

$$\Rightarrow w^T x_1 + b + \lambda w^T w = 1, \text{ where } w^T x_1 + b = -1 \quad (5)$$

-continued $$\Rightarrow -1 + \lambda w^T w = 1 \quad (6)$$

$$\Rightarrow \lambda w^T w = 2 \quad (7)$$

$$\Rightarrow \lambda = \frac{2}{w^T w} = \frac{2}{\|w\|^2} \quad (8)$$

And so, the distance λ‖w‖ is $$\frac{2}{\|w\|^2} \|w\| = \frac{2}{\|w\|} = \frac{2}{\sqrt{w^T w}}.$$

In order to increase the accuracy of the model, the margin may be maximized, e.g., the distance between the two SVM boundaries demarcating the classes may be maximized. This may involve maximizing $$\frac{2}{\sqrt{w^T w}},$$

which is equivalent to minimizing $$\frac{\sqrt{w^T w}}{2}$$

since square root is a monotonic function). This quadratic programming problem may be expressed by Equation 9:

$$\text{Min}_{w,b} \frac{w^T w}{2} \quad (9)$$

subject to $y_i(w^T x_i + b) \geq 1$ (∀ data points $x_i$). The foregoing equations may apply in the linear classifier case, but analogous equations may be used to determine the hyperplane and margin in a non-linear case.

With each new data point classified in use mode, the processing logic 11 may recalculate the hyperplane and/or the margin. In this way, the classifier model may "learn" how to improve or optimize the controllable variables to produce a more accurate result (e.g., in terms of a plot of better quality). For example, a new classification may produce a new support vector, which, in turn, may change the position and/or orientation of the hyperplane or its margin.

In one example, the user-defined and/or printer variable(s) may be adjusted along with the controllable variable(s) to move a data point into the solution space. For example, the curing (or drying) temperature may be adjusted during the plot while one or more of the user-defined variables are iteratively updated. When the resulting data point lies within the solution space (or an intended one of the sub-regions), then the print job may be performed based on the corresponding variables.

In some examples, the curing (or drying) temperature may be adjusted in a non-homogeneous way so that greater temperatures are selectively applied to zones of the plot that have a higher ink density than other portions of the plot. In one example, non-homogeneous curing (or drying) adjustments may be performed when there is noticeable lack of curing (or drying) in one specific area, or when the user prints on a narrow media which does not require heating of the full width of the curing module. As used herein, the term "curing" may alternatively refer to a drying or heating process that does not necessarily require curing.

In the case of lack of curing in one area, a vector may be used which is comprised of measured temperatures of each of the curing heaters, rather than the general curing temperature. The adjustment of the temperature variable may be performed using the element of the vector which corresponds to the location of the lack of curing (user defined location). In the case of use of a narrow media, an additional printer variable, media width, may be used, as well as the above-mentioned vector of temperatures representing the curing temperature controllable variable. The adjustment of the temperature variable may be performed using the elements of the temperature vector which correspond to the physical locations where there exists media.

In accordance with one or more examples, the systems and methods described herein may produce printed plots of improved quality. These examples may, for example, automatically control variables that affect printing of a latex plot in a way that ensures complete curing and reduces the occurrence of medium deformation and other defects due to temperature. In one example, the controllable variables are determined to optimize productivity and prevent unnecessary consumption of power by the printer. When margin requirements are implemented, printer energy efficiency is further improved.

One or more examples may further minimize operator interaction, which, in turn, may reduce the probability of defects caused by human errors. Additionally, print media waste may be reduced that otherwise may occur as a result of performing print jobs using predetermined or fixed controllable variables. In some examples, the user may select the desired benefit of the print job. The selected benefit may allow the classifier model to bias its results to emphasize one or more of energy efficiency, reduction of media waste, and productivity.

One or more of the aforementioned examples are described relative to a latex ink printer. However, other examples may apply to different types of printers that do not use latex ink and which have controllable variables that are based on user-defined and/or printer variables to perform print jobs. Examples include, but are not limited to, various types of toner-based printers and various types of ink jet printers.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method examples may transform the computer, processor, controller, or other signal processing device into a special-purpose processor for performing the methods described herein.

The controllers, processors, managers, logic and other signal generating and signal processing features of the examples described herein may be implemented in non-transitory logic which, for example, may include hardware, software, or both. When implemented at least partially in hardware, the controllers, processors, managers, logic and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, managers, logic and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method examples may transform the computer, processor, controller, or other signal processing device into a special-purpose processor for performing the methods described herein.

Also, another example may include a computer-readable medium, e.g., a non-transitory computer-readable medium, for storing the code or instructions described above. The code or instructions may cause one or more processors to implement operations of the examples described herein. The computer-readable medium may be a volatile or non-volatile memory or other storage device, which may be removably or fixedly coupled to the computer, processor, controller, or other signal processing device which is to execute the code or instructions for performing the method example or operations of the apparatus examples described herein.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although a number of examples are described herein, it should be understood that numerous other modifications and examples can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art. The examples may be combined to form additional examples.

We claim:

1. A system, comprising:
a memory to store instructions; and
a processor to execute the instructions to:
receive a set of first variables to control a printer;
determine one or more second variables based on the set of first variables; and
control a printer to perform a print job based on the set of first variables and the one or more second variables, wherein the processor is to implement machine-learning logic to determine the one or more second variables to have a predetermined plot quality, wherein:
the machine-learning logic includes a classifier model to classify the print job as having the predetermined plot quality based on the set of first variables and the one or more second variables, and the set of first variables includes one or more user-defined variables and/or one or more printer variables for the print job.

2. The system of claim 1, wherein the printer is a latex ink printer.

3. The system of claim 1, wherein the set of first variables includes one or more user-defined variables for the print job.

4. The system of claim 3, wherein the one or more user-defined variables include at least one of plot density or print mode.

5. The system of claim 1, wherein the set of first variables includes one or more printer variables.

6. The system of claim 5, wherein the one or more printer variables include at least one of leading edge starting position, time since a last plot was performed by the printer, or an ambient condition.

7. The system of claim 1, wherein the printer is a latex ink printer and wherein the one or more second variables include at least one of a temperature to cure latex ink, a pressure to cure latex ink, or a linear velocity of a print medium on which latex ink is to be printed for the print job.

8. A system, comprising:
a memory to store instructions; and
a processor to execute the instructions to:
receive a set of first variables to control a printer;
determine one or more second variables based on the set of first variables; and
control a printer to perform a print job based on the set of first variables and the one or more second variables, wherein the processor is to implement machine-learning logic to determine the one or more second variables to have a predetermined plot quality
wherein the machine-learning logic includes a classifier model which classifies the print job as having the predetermined plot quality based on the set of first variables and the one or more second variables, and wherein:
the classifier model is to
(a) generate a first data point defined by default values of the one or more second variables, and
(b) determine that the first data point lies outside of a solution space defined by the set of first variables; and
the processor is to adjust the one or more second variables to generate a second data point that lies within the solution space, wherein the processor is to control the printer to perform the print job based on the one or more adjusted second variables.

9. The system of claim 8, wherein:
the printer is a latex ink printer, and
the default values of the one or more second variables produce incomplete curing of the print job or deformation of a print medium for the print job.

10. The system of claim 9, wherein the one or more adjusted second variables correspond to at least one of:
a completely cured plot printed by the printer, or
a reduction in deformations of a print medium used for the print job.

11. The system of claim 8, wherein the processor is to adjust the one or more second variables to generate the second data point that lies within a sub-region of the solution space, the sub-region including one or more data points that are biased to correspond to a predetermined printer attribute.

12. A method, comprising:
receiving a set of first variables for a printer;
determining, using machine-learning logic, one or more second variables based on the set of first variables; and
controlling a printer to perform a print job based on the set of first variables and the one or more second variables, wherein the one or more second variables are determined by the machine-learning logic to have a predetermined plot quality, wherein:
the machine-learning logic includes a classifier model to classify the print job as having the predetermined plot quality based on the set of first variables and the one or more second variables, and
the set of first variables includes one or more user-defined variables and/or one or more printer variables for the print job.

13. The method of claim 12, wherein the printer is a latex ink printer.

14. The method of claim 12, wherein the set of first variables includes one or more user-defined variables for the print job.

15. The method of claim 12, wherein the set of first variables includes one or more printer variables.

16. The method of claim 12, wherein:
classifying the print job using the classifier model includes:
(a) generating a first data point defined by default values of the one or more second variables, and
(b) determining that the first data point lies outside of a solution space defined by the set of first variables; and
the method further comprises adjusting the one or more second variables to generate a second data point that lies within the solution space, wherein controlling the printer to perform the print job is performed based on the one or more adjusted second variables.

17. The method of claim 16, wherein the printer is a latex ink printer and wherein the default values of the one or more second variables produce incomplete curing of the print job or deformation of a print medium for the print job.

18. The method of claim 16, wherein the one or more second variables are adjusted to generate the second data point within a sub-region of the solution space, the sub-region including one or more data points that are biased to correspond to a predetermined printer attribute.

* * * * *